United States Patent
Venkatesh

(10) Patent No.: US 7,450,911 B1
(45) Date of Patent: Nov. 11, 2008

(54) MULTIPLEXED WIRELESS RECEIVER AND TRANSMITTER

(75) Inventor: Narasimhan Venkatesh, Hyderabad (IN)

(73) Assignee: Redpine Signals, Inc., San Jose, CA (US)

( * ) Notice: Subject to any disclaimer, the term of this patent is extended or adjusted under 35 U.S.C. 154(b) by 30 days.

(21) Appl. No.: 11/731,718

(22) Filed: Mar. 29, 2007

Related U.S. Application Data

(62) Division of application No. 10/743,576, filed on Dec. 21, 2003, now Pat. No. 7,218,896.

(51) Int. Cl.
*H04B 1/38* (2006.01)
*H04L 5/16* (2006.01)

(52) U.S. Cl. ............ 455/73; 455/90.2; 455/550.1; 375/219; 375/377

(58) Field of Classification Search ............ 455/73, 455/90.1–90.3; 375/219, 377
See application file for complete search history.

(56) References Cited

U.S. PATENT DOCUMENTS

| | | | |
|---|---|---|---|
| 5,479,453 A | 12/1995 | Anvari et al. | |
| 5,963,855 A * | 10/1999 | Lussenhop et al. | 455/226.2 |
| 5,963,856 A | 10/1999 | Kim et al. | |
| 6,519,339 B1 * | 2/2003 | Sacca et al. | 379/412 |
| 6,603,801 B1 | 8/2003 | Andren et al. | |
| 6,721,547 B2 | 4/2004 | Husted et al. | |
| 6,728,517 B2 * | 4/2004 | Sugar et al. | 455/73 |
| 6,731,953 B1 * | 5/2004 | McGowan et al. | 455/561 |
| 6,763,228 B2 | 7/2004 | Prentice et al. | |
| 2004/0071225 A1 * | 4/2004 | Suzuki et al. | 375/297 |
| 2004/0242183 A1 * | 12/2004 | Sugar et al. | 455/333 |

FOREIGN PATENT DOCUMENTS

EP 0797305 * 9/1997

* cited by examiner

*Primary Examiner*—Duc M Nguyen
(74) *Attorney, Agent, or Firm*—File-EE-Patents.com; Jay A. Chesavage

(57) ABSTRACT

A baseband receiver having quadrature analog outputs and a plurality of analog control and status signals and a transmit modulator having analog quadrature inputs and a plurality of analog control and status signals are coupled to a transmit processor having a digital output and a plurality of digital control and status signals and to a receive processor having a digital input and a plurality of digital control and status signals by multiplexing analog to digital converters and digital to analog converters such that during a receive time the converters are used for a receive purpose and during a transmit time, the converters are used for a transmit purpose.

27 Claims, 4 Drawing Sheets

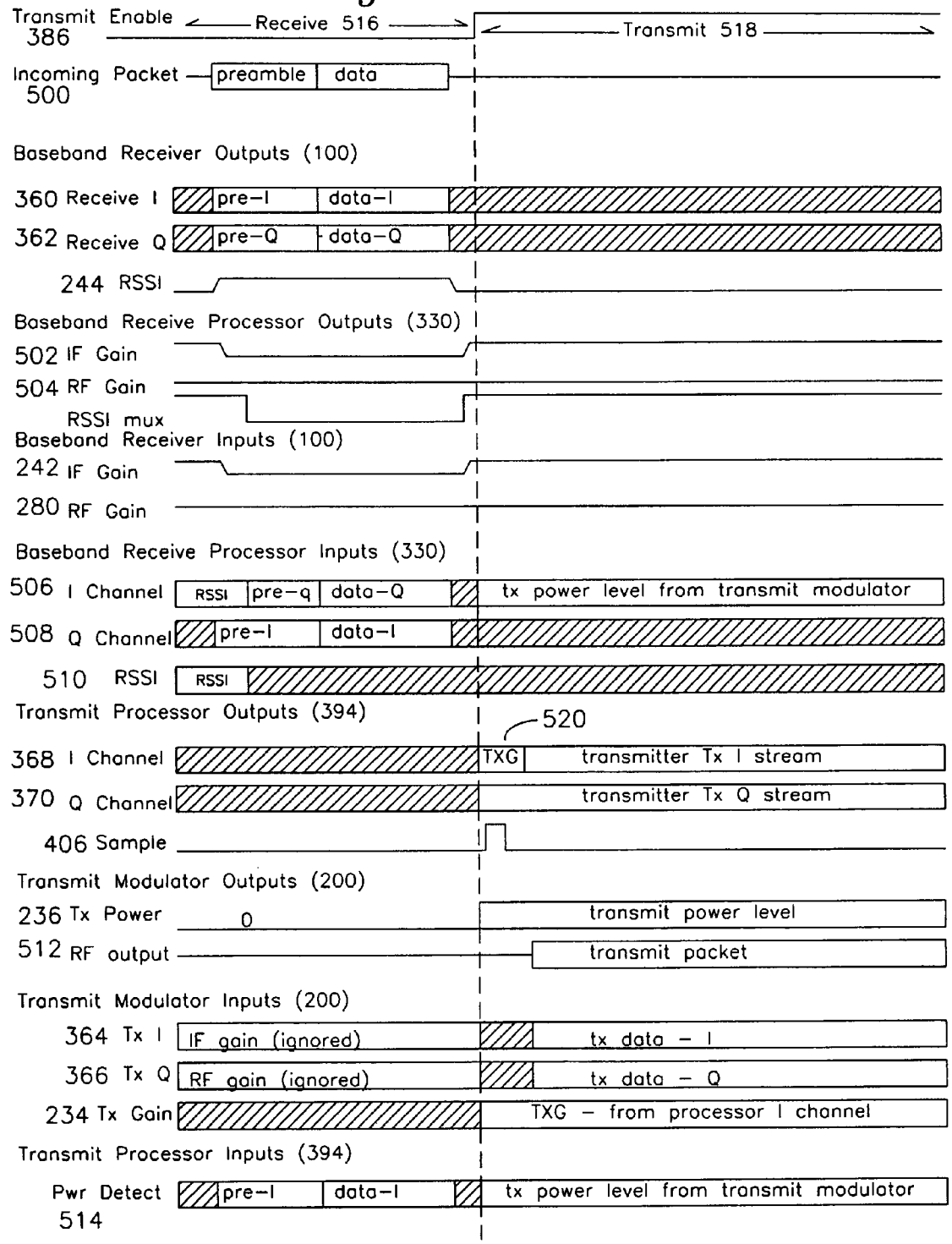

MULTIPLEXED WIRELESS RECEIVER AND TRANSMITTER

The present application is a divisional application of Ser. No. 10/743,576 filed on Dec. 21, 2003, now U.S. Pat. No. 7,218,896.

FIELD OF THE INVENTION

This invention relates to an architecture for the sharing of resources used in the analog front end of a wireless receiver and transmitter. The resources include analog to digital converters (ADC) and digital to analog converters (DAC) commonly used to interface entirely digital signal processors to entirely analog baseband receivers and transmit modulators.

BACKGROUND OF THE INVENTION

RF amplifiers, mixers, and filters are well known in the art of high frequency signal processing. An RF transmitter takes a baseband signal and modulates to a transmit frequency using an oscillator, mixer, and amplifiers. Typically, in an RF receiver, an amplifier increases the signal delivered by an antenna, and it is mixed to an intermediate frequency, or baseband frequency, and receives additional amplification. Prior art transmitters and receivers are typically constructed from high speed transistors and gain elements, and operate as analog elements, whereby a changing signal level on a single conductor carries all of the information required in the signal. For systems carrying analytic signals, a quadrature pair of signals is sufficient to fully describe the analytic signal.

FIG. 1 shows a prior art RF receiver comprising a baseband receiver 100, analog-digital conversion interface 120, and digital baseband receive processor 136, as well as a prior art transmitter comprising a digital baseband transmit processor 230, an analog-digital conversion interface 232, and a transmit modulator 200 coupled to a transmit antenna 202. These receiver and transmitter systems are well known for use in an 802.11 wireless system for receiving and transmitting ethernet packets. The baseband receiver 100 is shown as a dual conversion baseband receiver, and includes a receive antenna 102 for receiving incoming signals, an optional IF conversion stage 110, which includes a preamplifier 104 with an RF gain control 280 for control of preamplifier 104 gain. The preamplifier 104 drives a mixer 106, which also receives an input from a first local oscillator 108 such that the output of mixer 106 includes an image frequency at an intermediate frequency (IF), which is filtered by IF bandpass filter 238. The IF amplifier 240 receives this signal from the IF bandpass filter 238, and increases or decreases the signal level via IF gain control 242 before passing the signal on to the quadrature mixers 112 and 116, which are driven by quadrature oscillators 114 and 118. The quadrature mixing process generates quadrature outputs comprising an in-phase (I) and quadrature (Q) signal, which are the quadrature signal outputs of baseband receiver 100. The IF amplifier 240, or any subsequent stage which does signal processing after the variable gain control has been performed, generates a Receive Signal Strength Indicator (RSSI) status output 244, which is an analog signal related to signal strength after final amplification. This signal may be used by the digital baseband receive processor 136 to formulate the RF gain control 280 and IF gain control 242, which are analog signals after conversion by digital to analog converters (DAC) 134 and 132, respectively. Analog-digital converter interface 120 provides a conversion between the analog signal processing functions found in the baseband receiver 100 and the digital baseband receive processor 136. Analog quadrature baseband signals from the quadrature mixers 112 and 116 are filtered by low pass filters 124 and 128 before being digitized by analog to digital converters (ADC) 126 and 130, respectively. The analog-digital converter interface 120 also converts the analog RSSI status signal 244 into digital output for the digital baseband receive processor 136 status input, which also generates digital control outputs for IF gain and RF gain, which are fed to digital to analog converters (DAC) 132 and 134, respectively. The digital baseband receive processor 136 is generally an entirely digital functional block, which receives digital values and generates digital values, and these values are converted to and from analog values by the analog-digital converter interface 120, as has been described. In addition to RF and IF gain control management in response to either the RSSI status input or actual values presented to the in-phase (I) and quadrature (Q) channel interfaces, typical functions performed by the digital baseband receive processor 136 include signal stream synchronization, symbol extraction, demodulation, packet framing, and packet buffer management of ethernet packets received across analog-digital converter interface 120.

In addition to the double conversion heterodyne receiver shown in baseband receiver 100 which includes IF conversion stage 110, it is possible to omit the IF conversion stage 110 to form a direct, or single conversion receiver. In this case, incoming signals from receive antenna 102 are applied directly to IF amplifier 240, which is now acting as a gain controlled RF amplifier, in place of preamplifier 104. The output of the gain controlled RF amplifier 240 is fed to quadrature mixers 112 and 116. These quadrature mixers 112 and 116 are also receiving signals from quadrature oscillators 114 and 118 at the incoming RF frequency, thereby achieving direct baseband conversion and delivering quadrature outputs to analog-digital converter interface 120, as before.

The digital baseband transmit processor 230 of FIG. 1 performs analogous operations for the transmission of signals. Digital baseband transmit processor 230 removes packets for transmission from a packet buffer which may be shared with digital baseband receive processor 136, and converts the packet into a modulated baseband stream of quadrature digital data, which is digitized by digital to analog converters (DAC) 218 and 220, and then filtered by low pass filters 222 and 224. The resulting quadrature data stream from low pass filters 222 and 224 is converted to a modulation frequency by mixers 210 and 214 which are both fed by transmit oscillator 212. The signals are summed 206 and a single modulation product at the desired range of frequencies is selected via bandpass filter 208 and fed to power amplifier 204 which drives the transmit antenna 202. The power amplifier 204 accepts a gain control input 234, and also produces an RF output level status 236. The RF output level status 236 is converted by an ADC 228 and read by the digital baseband transmit processor 230, which may respond with a different value of digital transmit (TX) gain, which is converted by DAC 226 to TX gain control input 234 and fed to RF power amplifier 204. As with the digital baseband receive processor 136, the digital baseband transmit processor 230 is a function implemented using entirely digital components which may be integrated into a single digital integrated circuit or field programmable gate array (FPGA).

The digital signal processing of FIG. 1 is well known to one skilled in the art, and may be found in the disclosure of other wireless systems such as that described in U.S. Pat. No. 6,563,858 by Fakatselis et al, or in the datasheet for Intersil ISL3873B, datasheet number FN8019.2.

OBJECTS OF THE INVENTION

A first object of the invention is an apparatus for sharing functional blocks of a receive processor and a transmit processor with a baseband receiver and a modulator.

A second object of the invention is an apparatus for sharing digital to analog converters (DAC) between a receive processor and a transmit processor.

A third object of the invention is an apparatus for sharing analog to digital converters (ADC) between a receive processor and a transmit processor.

SUMMARY OF THE INVENTION

A digital transmit processor generates quadrature transmit data during a transmit time, and a digital receive processor generates a plurality of gain control signals during a receive time. A multiplexer selects between quadrature transmit data and receive gain control signals and furnishes these to a multiplexer which delivers the selected values simultaneously to a baseband processor requiring said plurality of gain control signals and a transmit modulator requiring said plurality of quadrature transmit data. The baseband receiver generates a received signal strength indicator (RSSI) as an analog signal and the transmit modulator generates a transmit power indicator as an analog signal, and these are selected by an analog switch, digitized, and fed to the baseband receive processor and the baseband transmit processor. Unless the baseband transmit processor is transmitting, the multiplexers of the invention are selecting receive baseband processor signals, and when the transmitter is enabled, the multiplexers are selecting transmit processor signals.

BRIEF DESCRIPTION OF THE DRAWINGS

FIG. 4 shows a timing diagram for the operation of the receiver-transmitter of FIG. 3.

DETAILED DESCRIPTION OF THE INVENTION

Figure 1:
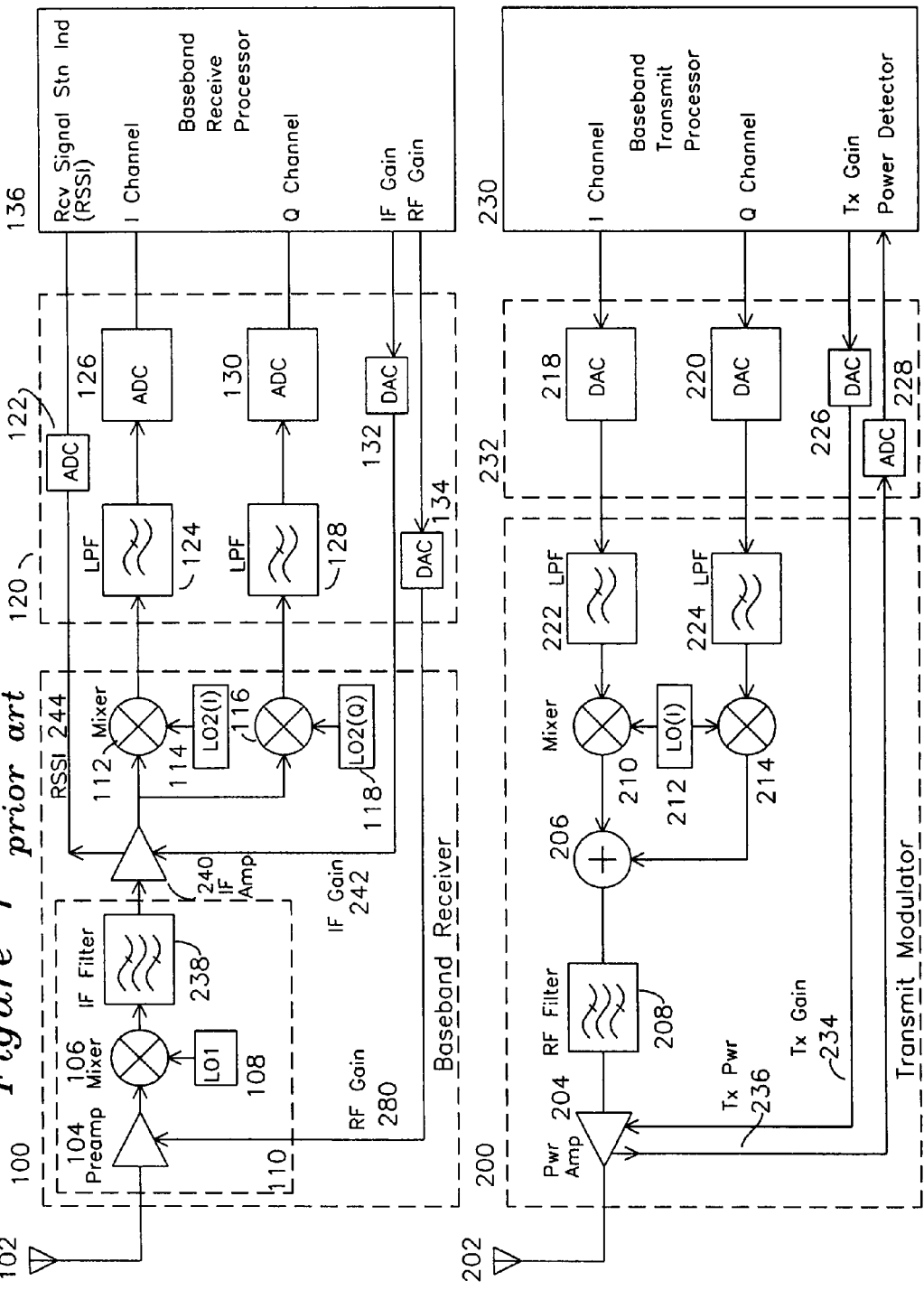
FIG. 1 shows the block diagram for a prior art receiver and transmitter.
Figure 2:
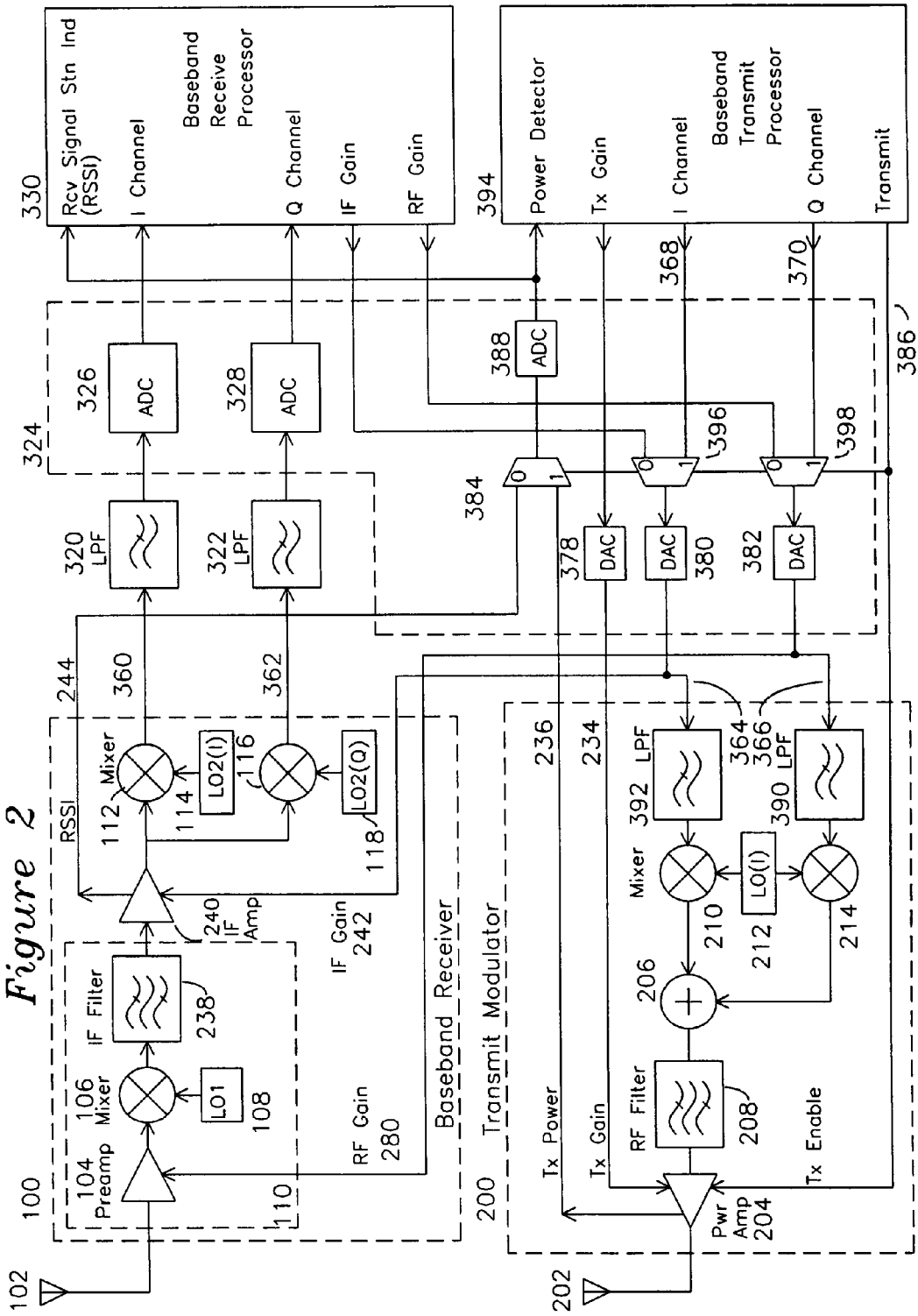
FIG. 2 shows the block diagram for a receiver and transmitter including multiplexed digital-analog converters.

FIG. 2 shows the baseband receiver 100, and transmit modulator 200 of FIG. 1, having inputs and outputs as were described earlier. The baseband receiver generates a pair of quadrature analog output signals 360 and 362, as well as a received signal strength indicator (RSSI) 244, and accepts as inputs analog signals RF gain control 280 and IF gain control 242. As was described for FIG. 1, block IF conversion stage 110 including RF gain control 280 of FIG. 2 is only present for a heterodyne receiver with an IF conversion stage 110, and for a direct conversion receiver, IF conversion stage 110 is not present. The transmit modulator 200 of FIG. 2 has quadrature digital inputs 364 and 366, Tx gain control 234, and generates transmit power RF output level status 236.

During non-transmit intervals, inactive transmit enable signal 386 is 0, which causes multiplexers 384, 396, and 398 to select the "0" input, whereby the RSSI status input 244 is fed to ADC 388, and is applied to RSSI status input of digital baseband receive processor 330. The IF and RF gain control outputs of the digital baseband receive processor 330 are applied to multiplexers 396 and 398, respectively, which select the "0" inputs of multiplexers 396 and 398 associated with inactive transmit enable signal 386, and the IF and RF gain control signals are generated by DAC 380 and 382, respectively, and fed to the baseband receiver 100. These signals are also delivered to the transmit modulator quadrature inputs 364 and 366, but have no effect, as the transmit enable signal 386 is also provided to the transmit modulator 200 and may be delivered to any point which causes the transmitter to be disabled, such as power amplifier 204 control signal Tx Enable.

During transmit intervals, the transmit enable signal 386 is active, or "1", which causes multiplexers 384, 396, and 398 to select the "1" input. In this mode, the quadrature outputs 368 and 370 of the digital baseband transmit processor 394 drive multiplexers 396 and 398, respectively, providing input to DACs 380 and 382, thereby providing the quadrature inputs 364 and 366, respectively, to transmit modulator 200. The transmitter is enabled by the transmit enable signal 386, when enables the power amplifier 204 to send the resulting mixed, up-converted, and amplified signals to the transmit antenna 202. The transmitted output power indication RF output level status 236 is passed to multiplexer 384, which has special provision to pass analog signals to ADC 388, which sends the Tx power level to the power detector input of the digital baseband transmit processor 394 as well as the RSSI input, which is ignored when transmit enable signal 386 is active. The digital baseband receive processor 330 ignores the signals presented to it during the transmit interval as identified by the transmit enable signal 386, using any mechanism known in the art of transmitter-receivers also known as transceivers. An analogous problem for the prior art receiver of FIG. 1 is the handling of signals found on quadrature inputs of digital baseband receive processor 136 during transmit intervals while the digital baseband transmit processor 230 is sending signals which are amplified to transmit antenna 202 which couple into receive antenna 102 and decode to quadrature inputs of digital baseband receive processor 136. This problem is often solved by having the digital inputs of the digital baseband receive processor 136 qualified by a signal such as a transmit enable signal which is generated by digital baseband transmit processor 230.

In this manner, the transmit enable signal 386 of FIG. 2 controls multiplexers 384, 396, 398, which select either receiver-related inputs or transmit-related inputs. The transmit enable signal 386 is only asserted true upon transmit, and at other times, the system is receiving packets. During transmit intervals, the proper transmit signals are routed to the transmit processor, and during receive intervals, the proper receive signals are routed to the receive processor. In this manner, the receiver and transmitter functions operate properly and independently.

Figure 3:
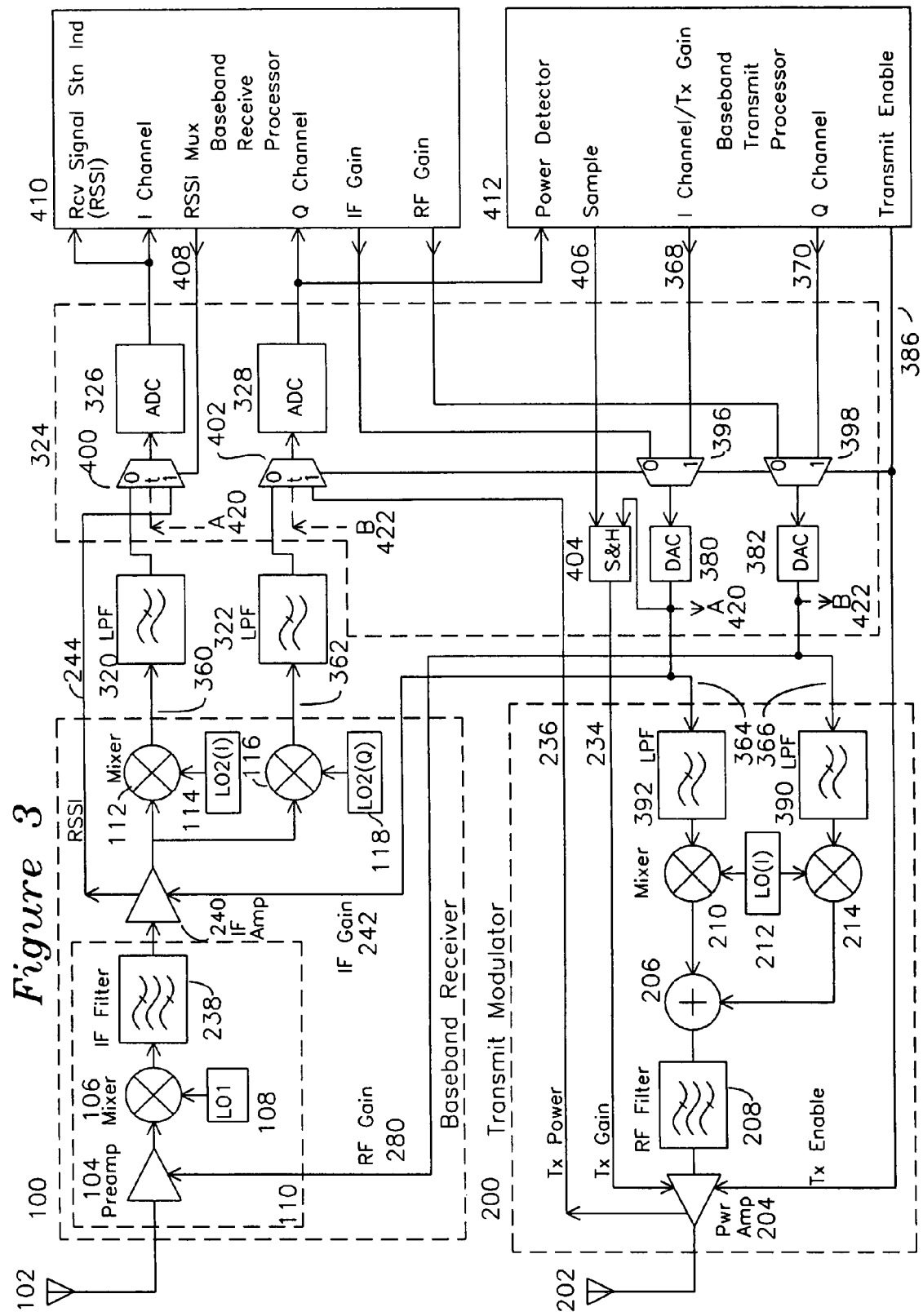
FIG. 3 is the block diagram for a receiver and transmitter including multiplexed digital-analog converters.

FIG. 3 shows a more efficient embodiment of the multiplexed receiver transmitter of FIG. 2 including modified baseband receive processor 410 and modified baseband transmit processor 412. FIG. 2 used three DAC elements (378, 380, 382) and three ADC elements (326, 328, 388). Additional multiplexing of converters in FIG. 3 reduces this to two ADCs (326, 328) and two DACs (380,382). In FIG. 3, the transmit enable signal 386 controls an additional multiplexer 402, and an additional multiplexer 400 changes state during the receive interval under control by RSSI mux control signal 408 from baseband receive processor 410. During the initial part of the packet receive, RSSI mux control signal 408 selects the RSSI signal 244 until a packet is being received, whereafter the RSSI measurement is taken and the RSSI mux control signal 408 switches to select the I channel 360 after filter 320. The Q channel 362 is selected by transmit enable signal 386 and delivered to ADC 328. The output of ADC 328 is delivered to both the baseband transmit processor 412 power detector status input, and to the Q channel of baseband receive processor 410. Multiplexer 402 is selecting the filtered quadrature receive Q channel 362 when transmit enable signal 386 is not active, and is selecting the tx power 236 when transmit enable signal 386 is active. The output of ADC 326 is delivered to both the I channel of the baseband receive processor 410 and the RSSI input of the baseband receive processor 410. The Tx gain control input 234 of the transmit modulator 200 is generated by the output of an analog sample and hold 404, which follows the analog input generated by DAC 380 when sample control 406 is asserted, and holds the last value sampled when sample control 406 is not asserted. In this manner, the Tx gain may be encoded into the I channel 368, selected during transmit time by multiplexer 396, converted into an analog signal by DAC 380, sampled with a value held by sample control 406, and this value held and presented as the Tx gain control input 234.

FIG. 3 also includes an optional test mode, whereby the first DAC 380 generates an analog output A 420 which is coupled to a test input t of multiplexer 400 and second DAC 382 generates an analog output B 422 which is coupled to multiplexer 402 test input t. In this manner, it is possible to add test functionality whereby the ADC multiplexers 400 and 402 are configured to select a test input A 420 and B 422, which are the values generated by DAC 380 and 382, respectively, in response to IF Gain and RF gain from bandpass receive processor 410, or in response to I and Q channel outputs 380 and 370 of baseband transmit processor 412. These represent optional outputs and inputs which may be used for end-to-end testing the functionality of the converter interface 324 through both DAC and ADC converters. It should also be clear to one skilled in the art that the digital outputs of the baseband receive processor 410 and baseband transmit processor 412 are two or more bits wide as known to one skilled in the art of digital representations of analog signals, and the multiplexers 400 and 402 perform as analog switches, in that their inputs and outputs are analog waveforms which are passed from input to output with minimal change in the voltage being passed, controlled by a digital select value which selects which input is to be passed to the output. This is in contrast to the multiplexers 396 and 398 which are passing a plurality of digital signals representing the two or more bit wide digital representations of these signals prior to conversion to analog signals by DACs 380 and 382. The test inputs of multiplexers 400 and 402 may be connected to either DAC output 380 or 382, and the same end-to-end test mechanism may be provided on the system of FIG. 2 by allowing the multiplexer 384 to accept an output from one or more of DAC 378, 380, or 382.

FIG. 4 shows the timing diagram for FIG. 3 during a receive event and a transmit event. Transmit enable signal 386 divides the timing diagram into a receive interval 516 and a transmit interval 518. When transmit enable signal 386 is not asserted, receive interval 516 is shown with incoming packet 500, which includes a preamble and data. The baseband receiver outputs 360 and 362 carry the quadrature preamble shown as pre-I and pre-Q followed by packet data shown as data-I and data-Q. During the preamble time, the receive processor 410 determines the signal strength and achieves codeword synchronization, and during the data interval, the receive processor 410 demodulates the data stream. During the entire packet, RSSI signal 244 indicates the receive power level, and the baseband receive processor 410 notes this level, and uses it to make any necessary change to the levels of IF gain control 502 or RF gain control 504, which are selected by multiplexers 396 and 398, respectively, converted to analog signals, and delivered to the receiver during receive interval 516 as IF gain 242 and RF gain 280, respectively. The presence of a packet as determined by the baseband receive processor 410 RSSI input also causes RSSI mux control signal 408 to assert, thereby causing the I channel 508 to switch from RSSI to preamble and data, as shown. The Q channel 508 continues to carry preamble-Q and data-Q during the receive interval 516, as shown.

During the transmit interval 518, the baseband receive processor 410 ignores the tx power level which is now multiplexed into Q channel input, while the power detect input 514 of the baseband transmit processor 412 uses this information to control the transmit gain by sending this on the I channel 368 and asserting sample control 406. This causes the sample and hold 404 of FIG. 3 to retain this value and send it as transmit modulator input Tx gain control input 234, as shown on FIG. 4. The transmit gain information 520 is placed into the I channel 368 before the preamble begins, so that the I channel 368 and Q channel 370 present valid quadrature data for modulation by transmit modulator 200 during transmit interval 518. Tx power 236 is also delivered to the transmit modulator using transmit modulator inputs 364 and 366, which results in RF output 512 to be radiated from the transmit antenna 202.

I claim:

1. A signal processing system for a wireless communication system, said signal processing system comprising:
   a baseband receiver having two or more control inputs and a status output;
   a transmit modulator having a quadrature input, one or more control inputs, and a status output;
   a baseband transmit processor having a quadrature output, a control output, a status input, and a transmit enable output;
   a baseband receive processor having at least two control outputs and a status input;
   a first multiplexer having an output, said output selecting either:
   one of said baseband receive processor control outputs
   or one of said baseband transmit processor quadrature outputs, said first multiplexer making a selection based on said transmit enable, said first multiplexer output coupled to a first digital to analog converter (DAC), said first DAC output coupled to one of said transmit modulator quadrature inputs and also to one of said baseband receiver control inputs;
   a second multiplexer having an output, said output selecting either:
   other said baseband receive processor control output or the other said baseband transmit processor quadrature output, said second multiplexer making a selection based on said transmit enable, said second multiplexer output coupled to the input of a second digital to analog converter (DAC), and delivering the output of said second DAC to the other of said transmit modulator quadrature inputs and also to the other of said baseband receiver control inputs;
   a third multiplexer having an output, said output selecting either said baseband receiver status output or said transmit modulator output, said third multiplexer output selection based on said transmit enable, said third multiplexer output coupled to a first analog to digital converter, the output of said analog to digital converter coupled to said baseband receive processor status input and also to said baseband transmit processor status input.

2. The signal processing system of claim 1 where said first multiplexer couples one of said baseband receive processor control outputs to said first DAC when said transmit enable is not active.

3. The signal processing system of claim 2 where at least one said baseband receive processor control input is a gain control input.

4. The signal processing system of claim 1 where said second multiplexer couples one of said baseband receive processor control outputs to said second DAC when said transmit enable is not active.

5. The signal processing system of claim 4 where said baseband receive processor control outputs is a gain control.

6. The signal processing system of claim 1 where said second multiplexer couples one of said baseband transmit processor quadrature outputs to said second DAC when said transmit enable is active.

7. The signal processing system of claim 1 where said third multiplexer couples one of said baseband receiver status outputs to said ADC when said transmit enable is not active.

8. The signal processing system of claim 7 where said one of baseband receiver status outputs is receive signal strength indication.

9. The signal processing system of claim 1 where said third multiplexer couples said transmit modulator status output to said first ADC when said transmit enable is active.

10. The signal processing system of claim 9 where said transmit modulator status output is a transmit power strength.

11. The signal processing system of claim 1 where at least one of said baseband receive processor or said baseband transmit processor is a digital circuit.

12. The signal processing system of claim 11 where said digital circuit is an integrated circuit.

13. The signal processing system of claim 11 where said digital circuit is a field programmable gate array (FPGA).

14. The signal processing system of claim 1 where said first multiplexer includes a test input which is coupled to said first DAC or to said DAC, selectable by said transmit enable.

15. The signal processing system of claim 1 where said second multiplexer includes a test input which is coupled to said first DAC or to said second DAC, selectable by said transmit enable.

16. A signal processing system for a wireless communications system, said signal processing system comprising:
a baseband receiver having two or more control inputs and a status output;
a transmit modulator having a quadrature input, one or more control inputs, and at least one status output;
a baseband receive processor having at least two control outputs;
a baseband transmit processor having a quadrature output, a control output, and a transmit enable output;
a first multiplexer having an output, said output selecting one of:
said baseband receive processor control output or one of said baseband transmit processor quadrature outputs, said first multiplexer making a selection based on said transmit enable, said first multiplexer output coupled to a first digital to analog converter (DAC), said first DAC output coupled to one of said transmit modulator quadrature inputs and also to one of said baseband receiver control inputs;
a second multiplexer having an output, said output selecting either:
other said baseband receive processor control output or the other of said baseband transmit processor quadrature outputs, said second multiplexer making a selection based on said transmit enable, said second multiplexer output coupled to a second digital to analog converter (DAC),
said second DAC output coupled to the other of said transmit modulator quadrature inputs and also to the other of said baseband receiver control inputs.

17. The signal processing system of claim 16 where said first multiplexer couples one of said baseband receive processor control outputs to said first DAC when said transmit enable is not active.

18. The signal processing system of claim 17 where at least one said baseband receive processor control output is a gain control signal.

19. The signal processing system of claim 16 where said first multiplexer couples one of said baseband transmit processor quadrature outputs to said first DAC when said transmit enable is active.

20. The signal processing system of claim 16 where said second multiplexer couples one of said baseband receive processor control outputs to said second DAC when said transmit enable is not active.

21. The signal processing system of claim 20 where at least one said baseband receive processor control outputs is a gain control signal.

22. The signal processing system of claim 16 where said second multiplexer couples one of said baseband transmit processor quadrature signals outputs to said second DAC when said transmit enable is active.

23. The signal processing system of claim 16 where said first multiplexer includes a test input which is coupled to said first DAC or to said DAC, selectable by said transmit enable.

24. The signal processing system of claim 16 where said first multiplexer includes a test input which is coupled to said first DAC or to said DAC, selectable by said transmit enable.

25. The signal processing system of claim 1 or 16 where said baseband receiver quadrature outputs and said transmit modulator quadrature inputs are analog signals.

26. The signal processing system of claim 1 or 16 where said baseband receive processor quadrature inputs and said baseband transmit processor outputs are digital signals having more than one bit of width.

27. A signal processing system having:
a receiver for receiving a wireless signal and generating a quadrature baseband output, said receiver generating a receive signal strength indicator (RSSI) proportional to received signal strength and accepting a receiver gain control input;
a transmitter for accepting a baseband quadrature input and modulating to a carrier frequency, said transmitter accepting a transmit gain control and generating a transmit power output;
a transmit enable indicating that said transmitter is active during a transmit interval, and not active at other times;
a baseband signal processor for accepting a digitized quadrature receiver input, a receive signal strength input, a transmit signal strength input, and generating a digitized quadrature transmit output, said baseband signal processor also generating said transmit enable, a receive gain control output, and a transmit gain control output;
a first digital to analog converter (DAC) having an output coupled to one of said transmitter quadrature inputs and also to said baseband receiver gain control input, said first DAC input coupled to a first multiplexer selecting said baseband signal processor gain control output when said transmit enable is inactive and to one of said baseband signal processor quadrature transmit outputs when said transmit enable is active;

a first analog to digital converter (ADC) having an output coupled to said receive signal strength input and also to said transmit signal strength input, said first ADC input coupled to a second multiplexer selecting said baseband receive signal strength indicator when said transmit enable is not active and said transmitter power output when said transmit enable is active;

a second digital to analog converter (DAC) having an input coupled to other said baseband signal processor quadrature transmit output and an output coupled to the other said transmitter quadrature input.

* * * * *

UNITED STATES PATENT AND TRADEMARK OFFICE
CERTIFICATE OF CORRECTION

| | |
|---|---|
| PATENT NO. | : 7,450,911 B1 |
| APPLICATION NO. | : 11/731718 |
| DATED | : November 11, 2008 |
| INVENTOR(S) | : Narasimhan Venkatesh |

It is certified that error appears in the above-identified patent and that said Letters Patent is hereby corrected as shown below:

Column 5, line 5 "selecting the tx power 236 when" should be changed to --selecting the Tx power 236 when--

Column 6, line 10 "ignores the tx power level" should be changed to --ignores the Tx power level--

Column 8, line 27 "processor quadrature signals outputs to said second DAC" should be changed to --processor quadrature outputs to said second DAC--

Signed and Sealed this

Tenth Day of November, 2009

David J. Kappos
*Director of the United States Patent and Trademark Office*